(12) United States Patent
Hayashi

(10) Patent No.: US 6,788,491 B2
(45) Date of Patent: Sep. 7, 2004

(54) TAPE LOADING APPARATUS AND TAPE RECORDER

(75) Inventor: Ryuji Hayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 95 days.

(21) Appl. No.: 10/318,828

(22) Filed: Dec. 13, 2002

(65) Prior Publication Data

US 2003/0112548 A1 Jun. 19, 2003

(30) Foreign Application Priority Data

Dec. 14, 2001 (JP) .................................. 2001-008153 U

(51) Int. Cl.⁷ .......................................... G11B 15/665
(52) U.S. Cl. ...................................................... 360/85
(58) Field of Search ........................................... 360/85

(56) References Cited

U.S. PATENT DOCUMENTS

| 5,617,270 A | * | 4/1997 | Tzeng et al. ................... 360/85 |
| 5,982,575 A | * | 11/1999 | Choi ............................. 360/85 |
| 6,198,592 B1 | * | 3/2001 | Hirabayashi et al. ......... 360/85 |
| 6,243,227 B1 | * | 6/2001 | Watanabe ..................... 360/85 |

FOREIGN PATENT DOCUMENTS

| JP | 29-81834 | 9/1999 |
| JP | U3079365 | 8/2000 |

OTHER PUBLICATIONS espEcenet Database—English Abstract of Japanese Patent Application No. JP8315467, published Nov. 29, 1996.

* cited by examiner

*Primary Examiner*—Robert S. Tupper
(74) *Attorney, Agent, or Firm*—Osha & May L.L.P.

(57) ABSTRACT

A tape loading apparatus having a first swinging arm. When a loading pin of the first swinging arm is elastically pressed against a positioning stopper at a loading position by an elastic force of a spring member, a joint portion of the first swinging arm maintains bent attitude having an angle smaller than 180° and no-tooth portion of a loading gear is in contact with a no-tooth portion of a mode gear. Even in case where a reactive force of the spring member causes the loading gear to generate a rotation force, the rotation force is received by a shaft member supporting the mode gear.

9 Claims, 6 Drawing Sheets

TAPE LOADING APPARATUS AND TAPE RECORDER

BACKGROUND OF THE INVENTION

1. Field of the Invention

The present invention relates to a tape loading apparatus which is incorporated into a video tape recorder (VTR).

2. Description of the Related Art

In Japanese Patent No. 2,981,834 (prior art 1), there is disclosed a magnetic tape loading mechanism. According to this magnetic tape loading mechanism, a stopper is disposed on the end portion of a guide groove formed in a chassis for guiding a movement of a tape guide, and the tape guide is elastically pressed against the stopper by an elastic force of a torsion spring. Thereby, attitude of the tape guide for winding a cassette tape around a rotary drum incorporating a magnetic head can be stabilized to keep the stability of the picture quality of the tape. Also, in the magnetic tape loading mechanism, an intermittent gear portion formed in an arm for moving the tape guide is meshingly engaged with an intermittent gear portion formed in a drive slider for mode switching and the arm is swung through a sliding motion of the drive slider to thereby move the tape guide. Further, in the magnetic tape loading mechanism, while the tape guide is being elastically pressed against the stopper, the reactive force of the torsion spring is received by the drive slider.

However, in the above magnetic tape loading mechanism, since the reactive force of the torsion spring when the tape guide is elastically pressed against the stopper is received by the drive slider for mode switching, there is a possibility that, when switching the modes of the video tape recorder, such as a recording mode, a reproducing mode, a fast-forwarding mode and a fast-rewinding mode after completion of the loading of the cassette tape, the drive slider cannot be moved smoothly due to the reactive force of the torsion spring.

On the other hand, in Japanese Utility Model No. 3,079,365 (prior art 2), there is disclosed a tape loading apparatus in which measures for preventing a spring force from being applied to a mode lever for mode switching in a tape loaded state are took. When switching the modes of the video tape recorder, such as a recording mode, a reproducing mode, a fast-forwarding mode and a fast-rewinding mode after completion of the loading, the mode lever can be moved smoothly. This tape loading apparatus will be described below with reference to FIG. 7.

In FIG. 7, reference character 1 designates a first swinging arm, while 2 stands for a second swinging arm. Since synchronous gears 11, 21 disposed on the respective base portions of the swinging arms 1, 2 are always meshingly engaged with each other, the swinging arms 1, 2 can be swung in a tape loading direction or in a tape unloading direction in a synchronized manner, and the swinging movements of the swinging arms 1, 2 can be guided by guide grooves 31, 32 respectively formed in a chassis 3. The swinging arms 1, 2 respectively include joint portions 4, 5 which can be bent. Loading arms 12, 22 are respectively connected to their associated loading levers 14, 24 through the joint portions 4, 5. The connected end portions of the loading levers 14, 24 are always elastically urged in the opposing directions by spring members 42, 52 made of coil springs which are disposed in their associated joint portions 4, 5. To the end portions of the loading levers 14, 24, there are connected sliders 13, 23 in a relatively swingable manner. Also, on the base portion of the first swinging arm 1, there is disposed a loading gear 18. The loading gear 18 can be meshingly engaged with a mode gear 6 which can be rotated while being meshingly engaged with a teeth row portion 71 formed in a mode lever 7 that can be sled right and left.

According to the tape loading apparatus of FIG. 7 disclosed in the prior art 2, in case where the mode lever 7 is moved up to a position which corresponds to a loading mode and the mode gear 6 is rotated to swing the first and second swinging levers 1, 2 in the tape loading direction as shown in FIG. 7, loading pins 16, 26 are elastically pressed against their associated positioning stoppers (not shown) respectively disposed in the end portions of the guide grooves 31, 41 by the elastic forces of the spring members 42, 52, so that the positions of the loading pins 16, 26 are respectively restricted to their associated loading position. At that time, the loading arm 12 and loading lever 14 of the first swinging arm 1 are stretched out in such a manner that they form a straight line, and the extension line of the force line F1 of the spring member 42 crosses the axis of a shaft portion 15 supporting the loading arm 12 of the first swinging arm 1. The extension line of the force line F2 of the spring member 52 disposed on the joint portion 5 of the second swinging arm 2 also crosses the axis of the shaft portion 15 supporting the loading arm 12 of the first swinging arm 1. Further, a pair of projections 10, 20 respectively disposed in the synchronous gears 11, 21 of the respective swinging arms 1, 2 are engaged with each other to thereby prevent the swinging arms 1, 2 from being swung in the tape loading direction.

In this way, the reactive forces of the spring members 42, 52 are received by the shaft portion 15 and thus the reactive forces are not applied to the mode gear 6 or mode lever 7. This eliminates a possibility that the motion of the mode lever can be interfered by the reactive force of the spring member 42 when switching the modes of the video tape recorder, such as a recording mode, a reproducing mode, a fast-forwarding mode and a fast-rewinding mode after completion of the loading of the cassette tape.

In the prior art 1, as described above, there is a possibility that, when switching the respective modes of the video tape recorder such as a recording mode, a reproducing mode, a fast-forwarding mode and a fast-rewinding mode after completion of the loading of the cassette tape, the movement of the drive slider is hindered by the reactive force of the torsion spring.

On the other hand, in the prior art 2, there is eliminated the problem with the mode switching operation found in the prior art 1.

However, in the prior art 2, only in case where the loading arm 12 and loading lever 14 of the first swinging arm 1 are stretched out in such a manner as to form a straight line and the extension line of the force line F1 of the spring member 42 crosses the axis of the shaft portion 15 supporting the loading arm 12 of the first swinging arm 1, the reactive force of the spring member 42 can be prevented from being applied to the mode lever 7. In other words, in case where the joint portion connecting together the loading arm 12 and loading lever 14 is bent even a little, there is generated in the mode gear 6 through the loading gear 18 a rotational force due to the reactive force of the spring member 42. Therefore, a load due to the reactive force of the spring member 42 is applied to the mode gear 6 and this load provides an obstacle to the smooth mode switching operation to be executed by the motion of the mode lever 7. The loading pin 16 disposed on the slider 13 of the first swinging arm 1 fulfills such a function as to maintain the traveling stability of the tape loaded when it is elastically pressed against the positioning stopper disposed on the end portion of the guide groove 31 by the elastic force of the spring member 42. When the loading pin 16 is held in a state where the position thereof cannot be restricted positively by the positioning stopper, the traveling stability of the positioning stopper is degraded to thereby lower the picture quality of the tape.

Therefore, in the tape loading apparatus according to the prior art 2, the smoothness of the mode switching operation and the stability of the picture quality can be realized only by securing the following two states: that is, one state in which the loading arm 12 and loading lever 14 of the first swinging arm 1 are stretched out in such a manner as to form a straight line to thereby allow the extension line of the force line F1 of the spring member 42 to cross the axis of the shaft portion 15; and, the other state in which the loading pin 16 is elastically pressed against the positioning stopper by the elastic force of the spring member 42 to thereby allow the positioning pin to positively restrict the position of the loading pin 16. However, from the viewpoint of the manufacturing precision of the guide groove 31 and first swinging arm 1, it is not easy to secure both of these two states.

SUMMARY OF THE INVENTION

It is an object of the invention to provide a tape loading apparatus which not only can secure the stability of the picture quality by elastically pressing a loading pin against a positioning stopper but also can secure the smoothness of the mode switching operation by preventing the reactive force of a spring member used to elastically press the loading pin against the positioning stopper from being applied to a mode switching member such as a mode lever.

Also, it is another object of the invention to provide a tape loading apparatus which, even without enhancing the manufacturing precision of the above-mentioned guide groove 31 and first swinging arm 1, can press the loading pin elastically against the positioning stopper to thereby be able to secure the stability of the picture quality and, at the same time, prevents the reactive force of the spring member used to elastically press the loading pin against the positioning stopper from being applied to the mode switching member such as the mode lever to thereby be able to secure the smoothness of the mode switching operation.

According to the invention, there is provided a tape loading apparatus comprising: a mode switching member having a teeth row portion; a mode gear being meshingly engageable with the mode switching member; a shaft member for rotatably supporting the mode gear; first and second swinging arms being synchronously swingable by a rotation of the mode gear to a loading position or to a unloading position; first and second loading pins disposed on leading end portions of the first and second swinging arms respectively, the first and second loading pins being projectingly movable to their respective loading positions for winding a cassette tape around a rotary drum by synchronous swinging movements of the first and second swinging arms in the tape loading direction; a chassis; and spring members disposed in the first and second swinging arms respectively, the spring members elastically urging the first and second loading pins against positioning stoppers respectively disposed in the chassis to position the first and second loading pins to the loading positions, wherein reactive forces of the spring members is received by the shaft member to prevent the reactive force from being applied to the mode switching member when the first and second loading pins are elastically pressed against the positioning stoppers.

According to the present invention, since the first and second loading pins are elastically pressed against their respective positioning stoppers disposed on the chassis by the elastic forces of the spring members respectively disposed on the first and second swinging arms to be thereby restricted to the above-mentioned respective loading positions, the traveling stability of the tape loaded can be secured and thus the stability of the picture quality of the tape can be enhanced. Also, because the reactive forces of the spring members can be received by the shaft member supporting the mode gear when the first and second loading pins are elastically pressed against their respective positioning stoppers and thus the reactive forces of the spring members can be prevented from being applied to the mode switching member, the movement of the mode switching member when switching the modes of the video tape recorder such as a recording mode, a reproducing mode, a fast-forwarding mode and a fast-rewinding mode after completion of the loading of the tape is not hindered by the reactive force of the spring member.

According to the invention, preferably, each of the first and second swinging arms comprises a bent link including two link members which are shiftably connected to each other at a joint portion in a state where the respective end portions of the two link members are elastically urged in their mutually opposing directions in the joint portion, and the joint portion of the first swinging arm maintains bent attitude having an angle smaller than 180° when the first loading pin is elastically pressed against the positioning stopper at the loading position by an elastic force of the spring member. According to the present structure, even in case where the manufacturing precision of the first swinging arm is not enhanced so much, the first loading pin can be elastically pressed against the positioning stopper at its loading position, which makes it possible to secure the traveling stability of the tape.

Also, according to the invention, preferably, on the base portion of the first swinging arm, there maybe disposed a loading gear meshingly engageable with the mode gear, and when the first loading pin is projected up to the loading position, a no-tooth portion formed in the loading gear is in contact with a no-tooth portion formed in the mode gear, whereby a rotation force generated in the loading gear when the loading gear receives the reactive force of the spring member is received by the shaft member. According to the present structure, even in case where a rotation force is generated in the loading gear by the reactive force of the spring member, the no-tooth portion of the present loading gear is contacted with the no-tooth portion of the mode gear to thereby be able to prevent generation of such a force as to rotate the mode gear. Therefore, the reactive force of the spring member can be received by the shaft member supporting the mode gear to thereby be able to prevent the present reactive force from being applied to the mode switching member.

According to the present invention, it is also possible to employ a structure that a pair of synchronous gears always meshingly engaged with each other are disposed separately on the respective base portions of the first and second swinging arms. According to the present structure, the first and second swinging arms can be synchronized to each other.

Further, according to the invention, preferably, each of the first and second swinging arms may comprise a loading arm including the synchronous gear, a slider including the loading pin, and a loading lever for connecting together the loading arm and loading lever in such a manner that they can be swung with respect to each other, and the connecting portion between the loading arm and loading lever may be composed of the above-mentioned joint portion. In this case, it is possible to employ a structure that each of the joint portions formed in the first and second swinging arms is formed by fitting a engaging pin disposed on the loading lever into an elongated hole so formed in a loading arm as to be long in the longitudinal direction of the tape loading arm; and, between the engaging pin and a spring receiving portion formed in the loading arm, there is interposed the above-mentioned spring member which is composed of a coil spring.

Moreover, according to the invention, preferably, in the chassis, there may be formed guide grooves respectively for guiding the projecting movements of the first and second loading pins, and on the respective end portions of these guide grooves, there may be disposed the above-mentioned positioning stoppers.

The present invention can also be enforced in a more specific manner by employing the following structure. That is, there can be provided a tape loading apparatus comprising: first and second swinging arms each including a loading arm having an elongated hole that extends in a longitudinal direction of the loading arm, a slider, a loading lever for connecting the loading arm and the slider in a relatively swingable manner, the loading lever having an engaging pin, a joint portion for connecting the loading arm and the loading lever, the joint portion being structured by fitting the engaging pin into the elongated hole, and a spring member interposed between the engaging pin and a spring receiving portion formed in the loading arm, the spring member urging the engaging pin and the loading arm so as to part them away from each other; a pair of synchronous gears disposed on base portions of the first and second swinging arms respectively, the pair of synchronous gears always meshingly engaged with each other; first and second loading pins disposed on leading end portions of the first and second swinging arms respectively, the first and second loading pins being projectingly movable to their respective loading positions for winding a cassette tape around a rotary drum by swinging movements of the first and second swinging arms in the tape loading direction; a chassis having guide grooves for guiding the projecting movements of the first and second loading pins respectively; positioning stoppers disposed on end portions of the guide grooves respectively for positioning the first and second loading pins being elastically pressed by an elastic force of the spring member at their respective loading positions; a loading gear disposed on the base portion of the first swinging arm; a mode gear being meshingly engageable with the loading gear to rotate the loading gear; a shaft member for rotatably supporting the mode gear; and a mode switching member having a teeth row portion being meshingly engageable with the mode gear, wherein the joint portion of the first swinging arm maintains bent attitude having an angle smaller than 180° and a no-tooth portion formed in the loading gear is in contact with a no-tooth portion formed in the mode gear when the loading pin of the first swinging arm is elastically pressed against the positioning stopper at the loading position by the elastic force of the spring member, whereby a rotation force generated in the loading gear when the loading gear receives a reactive force of the spring member is received by the shaft member, the pair of synchronous gears have a pair of projections which abut against each other to prevent the first and second swinging arms from extreme swinging over their loading positions.

DETAILED DESCRIPTION OF THE PREFFERED EMBODIMENTS

Figure 1:
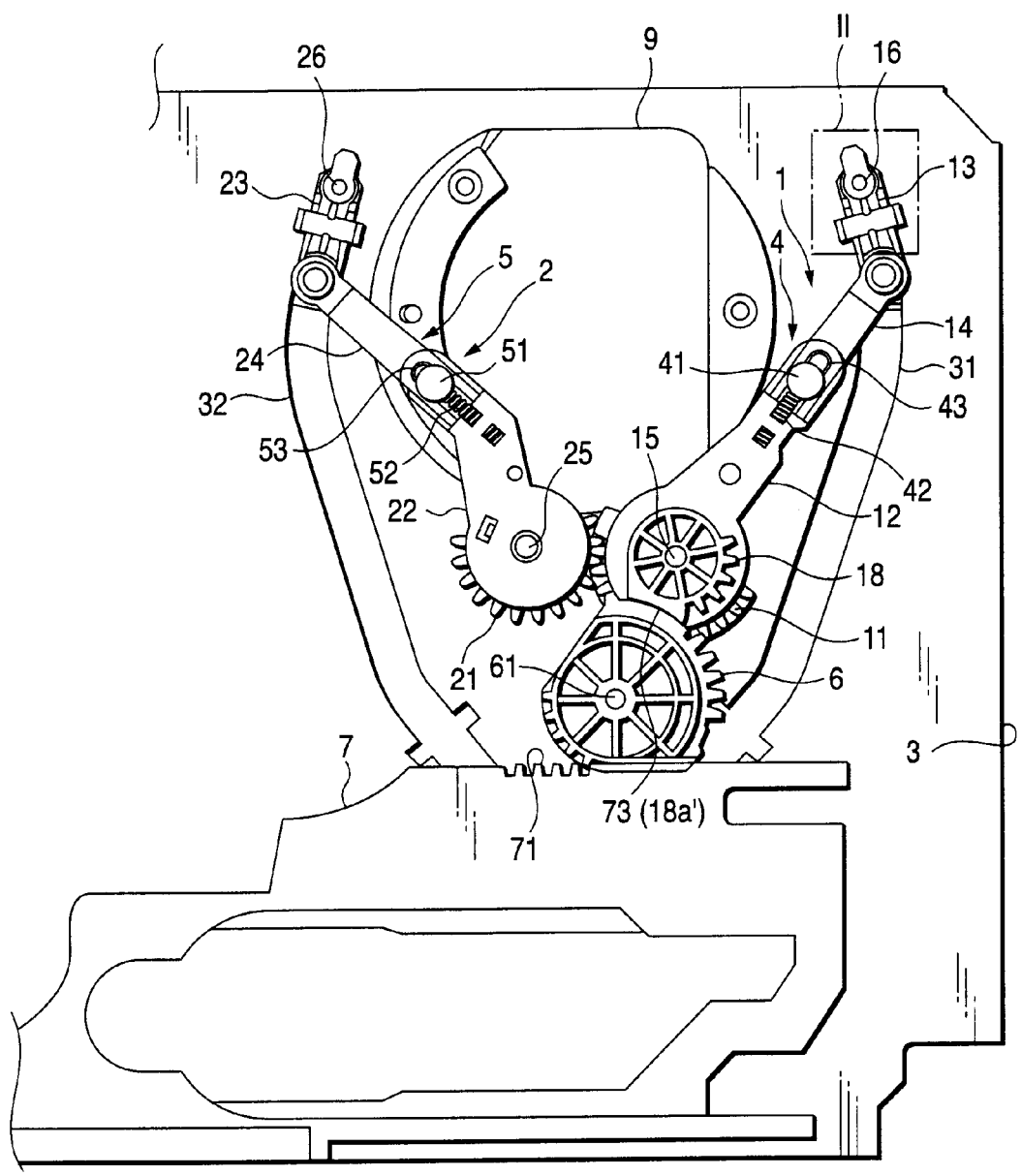
FIG. 1 is a schematic structure view of a tape loading apparatus according to the invention.
Figure 2:
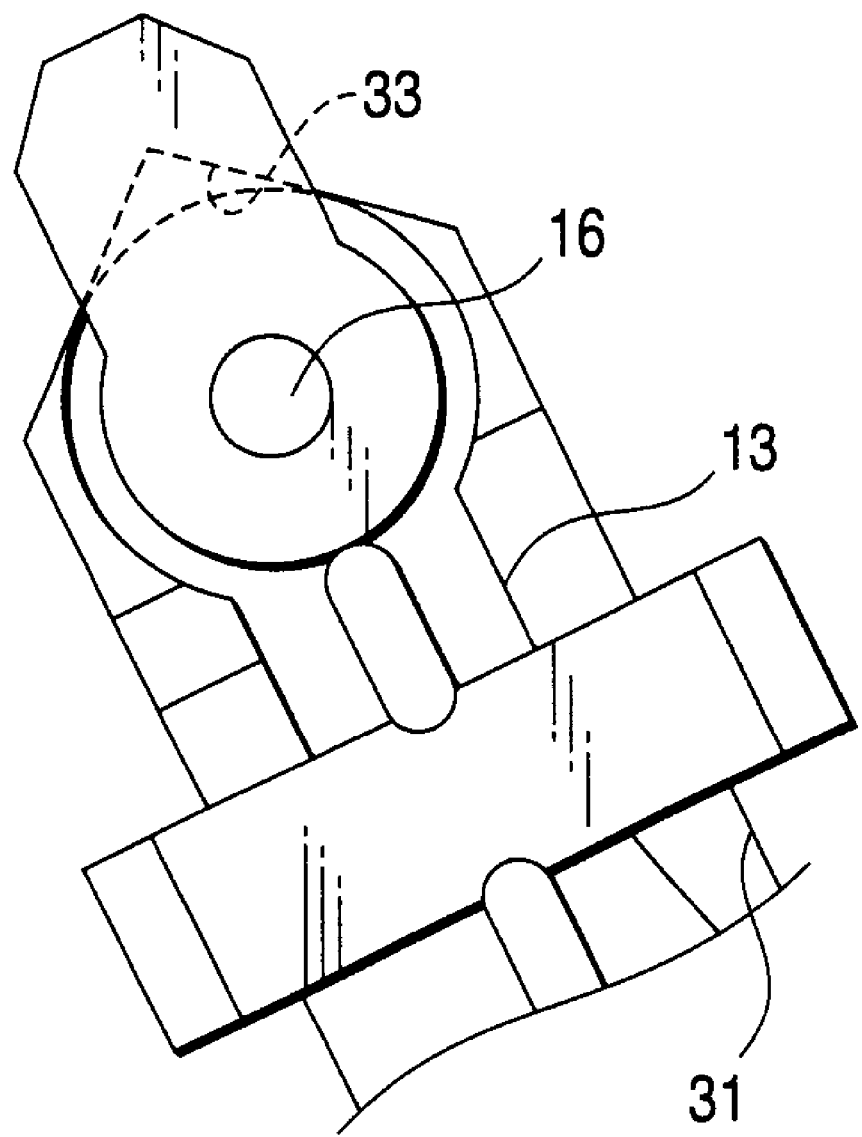
FIG. 2 is an enlarged view of the portion II shown in FIG. 1.
Figure 3:
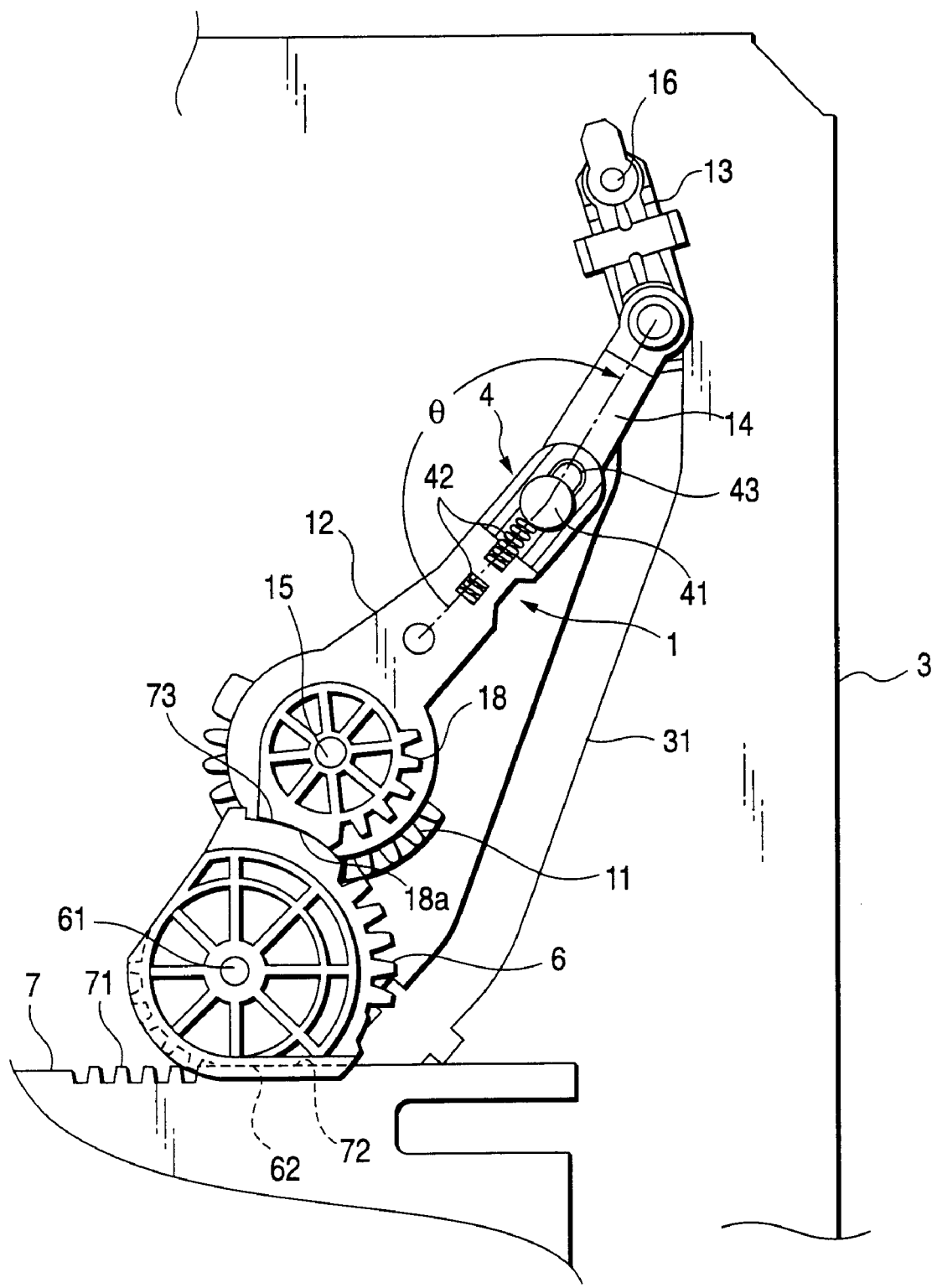
FIG. 3 is a plan view of the tape loading apparatus, with a first swinging arm 1 enlarged.
Figure 4:
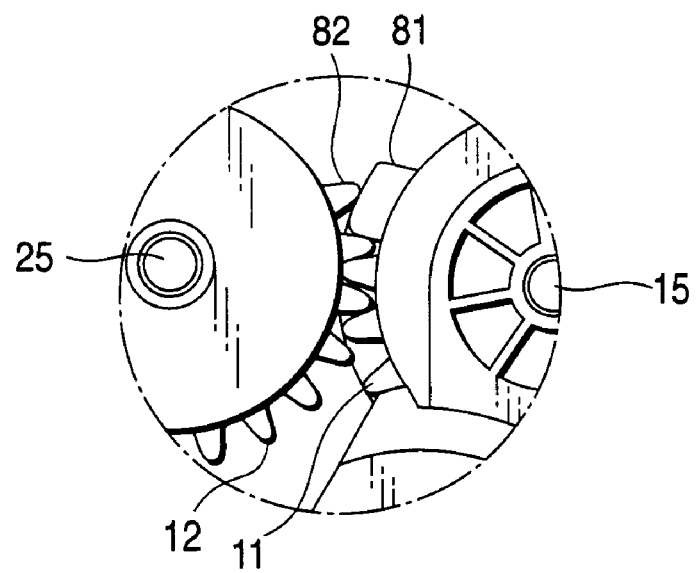
FIG. 4 is a partially enlarged view of the tape loading apparatus, showing no-tooth portions of a mode gear and a loading gear.
Figure 5:
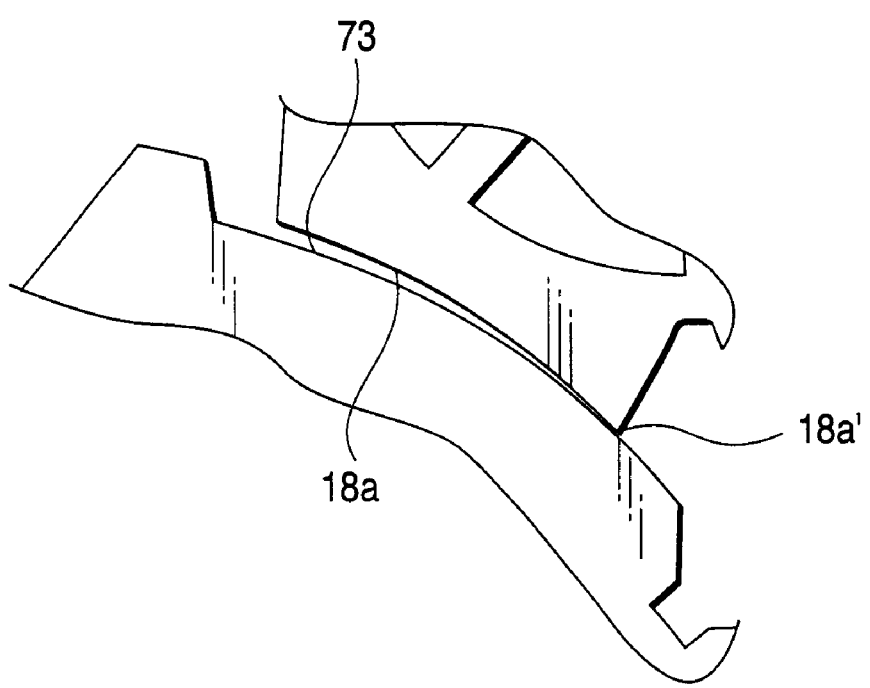
FIG. 5 is a partially enlarged view of the tape loading apparatus, explaining operations of projections respectively disposed on synchronous gears.
Figure 6:
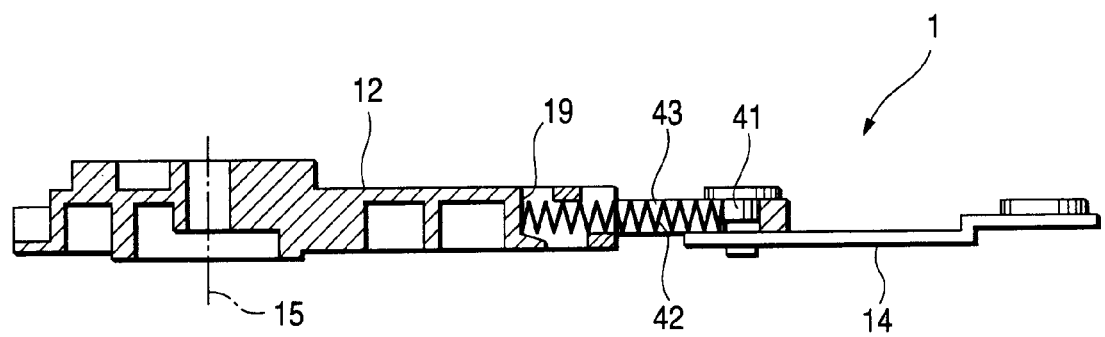
FIG. 6 is a sectional view of the first swinging arm.
Figure 7:
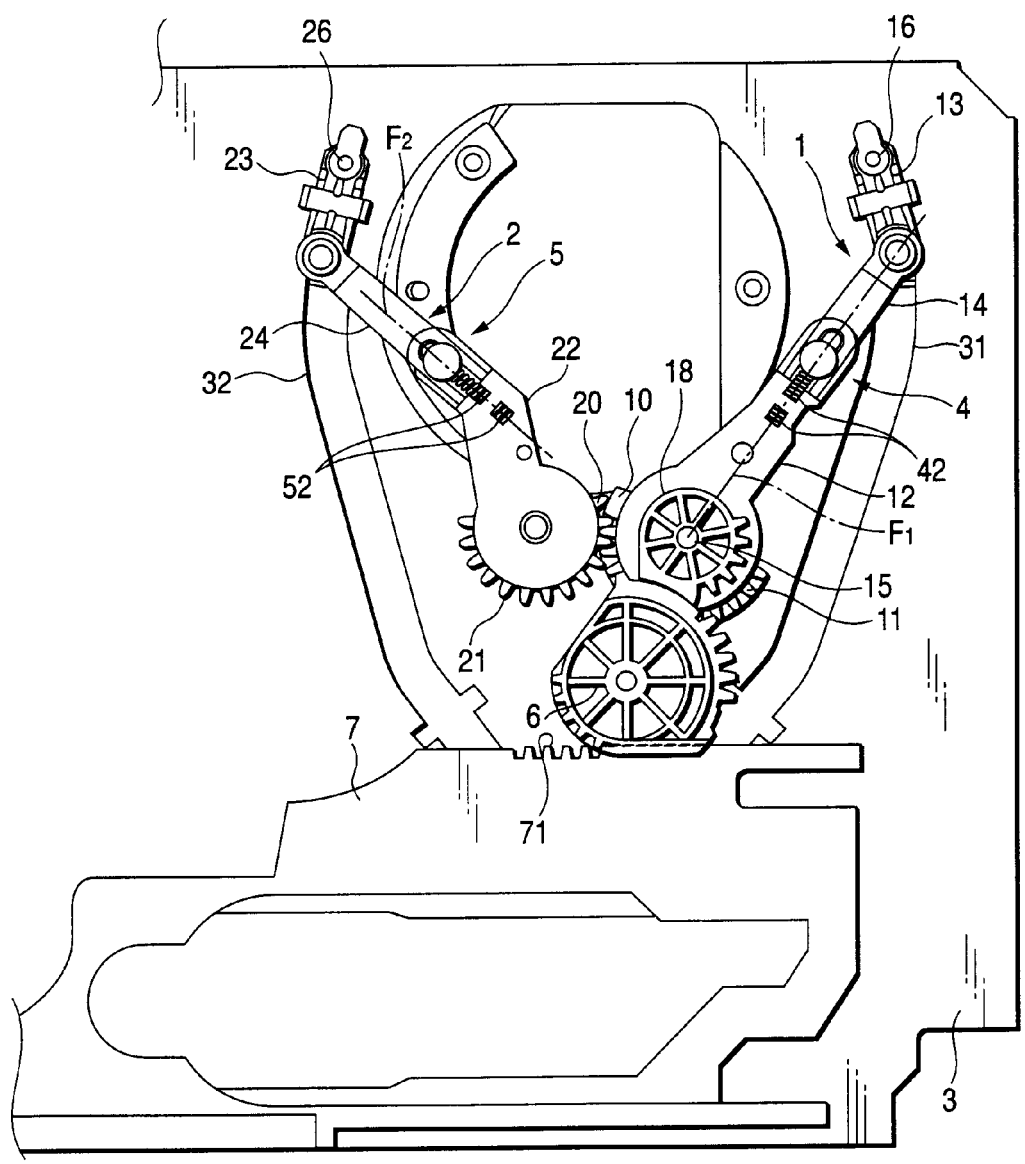
FIG. 7 is a schematic structure view of a tape loading apparatus according to prior art 2.

FIG. 1 is a schematic structure view of a tape loading apparatus according to the invention; FIG. 2 is an enlarged view of portion II shown in FIG. 1; FIG. 3 is a plan view of the tape loading apparatus, with a first swinging arm 1 enlarged; FIG. 4 is a partially enlarged view of the tape loading apparatus, showing the teeth portions 18a, 73 of a mode gear 6 and a loading gear 18; FIG. 5 is a partially enlarged view the tape loading apparatus, explaining the operations of projections 81, 82 respectively disposed on synchronous gears 11, 12; and, FIG. 6 is a sectional view of the first swinging arm 1.

In FIG. 1, reference character 1 designates a first swinging arm, while 2 stands for a second swinging arm. The first and second swinging arms 1, 2 are respectively formed in a bent-link-like shape. The first and second swinging arms 1, 2 comprise loading arms 12, 22 including synchronous gears 11, 21 in their respective base portions, sliders 13, 23 respectively to be guided by their associated guide grooves 31, 33 formed in a chassis 3, and loading levers 14, 24 respectively for connecting together their associated loading arms 12, 22 and sliders 13, 23. Also, the swinging arms 1, 2 respectively include joint portions 4, 5 which can be bent. The joint portions 4, 5 respectively connect together their associated loading arms 12, 22 and loading levers 14, 24, while the mutually connected end portions of the loading arms 12, 22 and loading levers 14, 24 are always elastically urged in their mutually opposing directions by spring members 42, 52 which are respectively composed of coil springs and are disposed in their associated joint portions 4, 5. Referring to the first swinging arm 1 which is enlargedly shown in FIGS. 3 and 6, an engaging pin 41 disposed on the end portion of the loading lever 14 is fitted into an elongated hole 43 formed in the loading arm 12. The spring member 42 composed of a coil spring is interposed between the engaging pin 41 and a spring receiving portion formed in the loading arm 12. By the elastic force of the spring member 42, the mutually connected end portions of the loading arm 12 and loading lever 14 are always elastically urged in their mutually opposing directions. The slider 13 is connected to the end portion of the loading lever 14 in a relatively swingable manner The slider 13 includes a loading pin 16. The second swinging arm 2 is similar in structure to the first swinging arm 1. As shown in FIG. 1, an engaging pin 51 disposed on the end portion of the loading lever 24 is fitted into an elongated hole 53 formed in the loading arm 22; the spring member 52 composed of a coil spring is interposed between the engaging pin 51 and a spring receiving portion (not shown) formed in the loading arm 22; and by the elastic force of the spring member 52, the mutually connected end portions of the loading arm 22 and loading lever 24 are always elastically urged in their mutually opposing directions. Also, the slider 23 is connected to the end portion of the loading lever 44 in a relatively swingable manner. The slider 23 includes a loading pin 26. By the way, the elongated holes 43, 53 have shapes which are respectively long in the longitudinal direction of their associated loading arms 12, 22.

On the base portion of the first swinging arm 1, there is disposed a loading gear 18. The loading gear 18 can be meshingly engaged with a mode gear 6 which can be meshingly engaged with and rotated together with the teeth row portion 71 of a mode switching member (which is hereinafter referred to as a mode lever) composed of a mode lever that can sled right and left. Also, the base portions of the first and second swinging arms 1, 2 are respectively mounted on the chassis 3 through their associated shaft portions 15, 25, while the mode gear 6 is mounted on the chassis 3 through a shaft member 61.

As shown in FIG. 3, the mode lever 7 includes a flat no-tooth portion 72. After completion of the loading of the tape, a flat no-tooth portion 62 formed in the mode gear 6 is superimposed on top of the no-tooth portion 72, so that, even in case where the mode lever 7 is moved right and left in the mode switching operation, the mode gear 6 can be prevented against rotation. Further, the mode lever 7 includes another no-tooth portion 73 having a convex arc shape; and, after completion of the tape loading, a concave-arc-shaped no tooth portion 18a formed in the loading gear 18 is super imposed on top of the convex-arc-shaped no tooth portion 73 to thereby be able to position the first swinging arm 1.

As shown in FIG. 2, on the end portion of the guide groove 31 for guiding the loading pin 16 of the first swinging arm 1, there is disposed a positioning stopper 33 that positions the loading pin 16, which is elastically pressed by the elastic force of the spring member 42, at its loading position. Although not shown, on the end portion of the guide groove 32 for guiding the loading pin 26 of the second swinging arm 2 shown in FIG. 1 as well, there is disposed a positioning stopper that positions the loading pin 26, which is elastically pressed by the elastic force of the spring member 52, at its loading position. The loading pins 16, 26 are respectively elastically pressed against their associated positioning stoppers 33 on the end portions of their associated guide grooves 31, 32 by the elastic forces of the spring members 42, 52, thereby maintaining the traveling stability of the tape loaded.

In the present tape loading apparatus, when the loading pin 16 of the first swinging arm 1 is elastically pressed against the positioning stopper 33 at the loading position (which has been described with reference to FIG. 2) by the elastic force of the spring member 42, as shown in FIG. 1 or FIG. 3, the joint portion 4 keeps its attitude in which it is bent at angle near to and smaller than 180°. As shown in FIG. 5, one end 18a' of the concave-arc-shaped no tooth portion 18a of the loading gear 18 is in contact with the convex-arc-shaped no tooth portion 73 of the mode gear 6. Here, the concave-arc-shaped no tooth portion 18a of the loading gear 18 is formed concentric with the shaft member 61. Therefore, in a state where one end 18a' of the concave-arc-shaped no tooth portion 18a of the loading gear 18 is in contact with the convex-arc-shaped no tooth portion 73 of the mode gear 6, the direction of a force generated due to the present mutual contact action is along a direction which crosses the axis of the shaft member 61.

According to the above-structured tape loading apparatus, in the tape loading mode, the mode gear 6 and the teeth row portion 71 of the mode lever 7 are meshingly engaged with each other and the mode lever 7 is moved. Due to a tape loading operation at that time, the loading pins 16, 26 of the first and second swinging arms 1, 2 are respectively guided in their associated guide grooves 31, 32 through the swinging movements of the first and second swinging arms 1, 2 in the tape loading direction and are thereby projectingly moved with respect to the loading position where a cassette tape (not shown) can be wound around a rotary drum 9 incorporating a magnetic tape therein. In a state where the tape loading operation is completed, the joint portion 4 of the first swinging arm 1 keeps its bent attitude, in which it is bent at angle near to but smaller than 180°, and the loading pin 16 is elastically pressed against the positioning stopper 33 by the elastic force of the spring member 42 and the loading pin 26 of the second swinging arm 2 is also elastically pressed against the positioning stopper by the elastic force of the spring member 52. Therefore, the traveling stability of the tape when the mode lever 7 is thereafter moved and the mode is switched can be maintained properly by the left and right loading pins 16, 26. Also, as described above, by employing the structure in which the joint portion 4 of the first swinging arm 1 can keep its bent attitude, in which it is bent at angle near to and smaller than 180°, and the loading pin 16 is elastically pressed against the positioning stopper 33 by the elastic force of the spring member 42, even in case where the manufacturing dimension precision of the first swinging arm 1 and guide groove 31 is not enhanced so much, the first loading pin 16 can be elastically pressed against the positioning stopper 33 at its loading position. This makes it possible to secure the traveling stability of the tape.

Further, in case where the joint portion 4 of the first swinging arm 1 keep its bent attitude, in which it is bent at angle near to and smaller than 180°, and the loading pin 16 is elastically pressed against the positioning stopper 33 by the elastic force of the spring member 42, the reactive force of the spring member 42 when the first loading pin 16 is elastically pressed against the positioning stopper 33 acts as a force which rotates the loading gear 18. However, as has been described with reference to FIG. 5, one end 18a' of the concave-arc-shaped no tooth portion 18a of the loading gear 18 is contacted with the convex-arc-shaped no tooth portion 73 of the mode gear 6 and is thereby received by the shaft member 61, which can eliminate the possibility that the reactive force of the spring member 42 acting as a force for rotating the loading gear 18 is applied to the mode lever 7. Therefore, the movement of the mode lever 7 when switching the modes of the video tape recorder, such as a recording mode, a reproducing mode, a fast-forwarding mode and a fast-rewinding mode after completion of the loading of the cassette tape is not hindered by the reactive force of the spring member 42.

According to the present embodiment, as shown in FIG. 4 in an enlarged manner, on the synchronous gears 11, 12 which are disposed on the respective base portions of the first and second swinging arms 1, 2 and are always meshingly engaged with each other, there are disposed projections 81, 82, respectively. When the first and second loading pins 16, 26 are moved to their respective loading positions as shown in FIG. 1, the projections 81, 82 abuts against each other. According to this arrangement, the mutual butting between the projections 81, 82 is sure to prevent occurrence of a phenomenon that the loading gear 18 is rotated too much for some reason from the state where the first and second loading pins 16, 26 are moved to their respective loading positions shown in FIG. 1 and the first and second swinging arms 1, 2 are swung further in the tape loading direction. In the case of the present embodiment, the projection 81 on the synchronous gear 11 side is disposed so as to be adjacent to the teeth row of the loading gear, while the mating projection 82 on the tuning gear 12 side is formed of a teeth portion which is situated in the terminal portion of the teeth row of the tuning gear 12.

As described above, according to the invention, since the reactive forces of the spring members, when the first and second loading pins are respectively elastically pressed against their associated positioning stoppers, can be received by the shaft member supporting the mode gear and thus the reactive forces of the spring members can be prevented from being applied to the mode switching member such as the mode lever, not only the traveling stability of the tape loaded can be enhanced by the first and second loading pins to thereby enhance the stability of the picture quality of the tape, but also, when switching the modes of the video tape recorder after completion of the loading of the tape, the mode switching member such as the mode lever can be moved smoothly without being hindered by the reactive forces of the spring members.

Especially, in the case of a tape loading apparatus in which the joint portion of the first swinging arm can keep its bent attitude having a bent angle smaller than 180° when the first loading pin is elastically pressed against the positioning stopper at its loading position by the elastic force of the spring member, even in case where the manufacturing dimension precision of the first swinging arm and guide groove for guiding the loading pin is not enhanced so much, it can be made easy not only to enhance the traveling stability of the above-mentioned loaded tape to thereby enhance the stability of the picture quality of the tape, but also to perform the smooth mode switching operation after completion of the loading of the tape.

What is claimed is:

1. A tape loading apparatus comprising:
   first and second swinging arms each including
      a loading arm having an elongated hole that extends in a longitudinal direction of the loading arm,
      a slider,
      a loading lever for connecting the loading arm and the slider in a relatively swingable manner, the loading lever having an engaging pin,
      a joint portion for connecting the loading arm and the loading lever, the joint portion being structured by fitting the engaging pin into the elongated hole, and
      a spring member interposed between the engaging pin and a spring receiving portion formed in the loading arm, the spring member urging the engaging pin and the loading arm so as to part them away from each other,
   a pair of synchronous gears disposed on base portions of the first and second swinging arms respectively, the pair of synchronous gears always meshingly engaged with each other;
   first and second loading pins disposed on leading end portions of the first and second swinging arms respectively, the first and second loading pins being projectingly movable to their respective loading positions for winding a cassette tape around a rotary drum by synchronous swinging movements of the first and second swinging arms in the tape loading direction;
   a chassis having guide grooves for guiding the projecting movements of the first and second loading pins respectively;
   positioning stoppers disposed on end portions of the guide grooves respectively for positioning the first and second loading pins being elastically pressed by an elastic force of the spring member at their respective loading positions;
   a loading gear disposed on the base portion of the first swinging arm;
   a mode gear being meshingly engageable with the loading gear to rotate the loading gear; and
   a shaft member for rotatably supporting the mode gear;
   a mode switching member having a teeth row portion being meshingly engageable with the mode gear,
   wherein the joint portion of the first swinging arm maintains bent attitude having an angle smaller than 180° and a no-tooth portion formed in the loading gear is in contact with a no-tooth portion formed in the mode gear when the loading pin of the first swinging arm is elastically pressed against the positioning stopper at the loading position by the elastic force of the spring member, whereby a rotation force generated in the loading gear when the loading gear receives a reactive force of the spring member is received by the shaft member, and
   the pair of synchronous gears have a pair of projections which abut against each other to prevent the first and second swinging arms from extreme swinging over their loading positions.

2. A tape loading apparatus comprising:
   a mode switching member having a teeth row portion;
   a mode gear being meshingly engageable with the mode switching member;
   a shaft member for rotatably supporting the mode gear;
   first and second swinging arms being synchronously swingable by a rotation of the mode gear to a loading position or to a unloading position;
   first and second loading pins disposed on leading end portions of the first and second swinging arms respectively, the first and second loading pins being projectingly movable to their respective loading positions for winding a cassette tape around a rotary drum by synchronous swinging movements of the first and second swinging arms in the tape loading direction;
   a chassis; and
   spring members disposed in the first and second swinging arms respectively, the spring members elastically urging the first and second loading pins against positioning stoppers respectively disposed in the chassis to position the first and second loading pins to the loading positions,
   wherein reactive forces of the spring members is received by the shaft member to prevent the reactive force from being applied to the mode switching member when the first and second loading pins are elastically pressed against the positioning stoppers.

3. A tape loading apparatus according to claim 2, wherein each of the first and second swinging arms comprises a bent link including two link members which are shiftably connected to each other at a joint portion in a state where the respective end portions of the two link members are elastically urged in their mutually opposing directions in the joint portion, and
   the joint portion of the first swinging arm maintains bent attitude having an angle smaller than 180° when the first loading pin is elastically pressed against the positioning stopper at the loading position by an elastic force of the spring member.

4. A tape loading apparatus according to claim 3, further comprising: a loading gear disposed on a base portion of the first swinging arm, the loading gear being meshingly engageable with the mode gear, when the first loading pin is projected up to the loading position, a no-tooth portion formed in the loading gear is in contact with a no-tooth portion formed in the mode gear, whereby a rotation force generated in the loading gear when the loading gear receives the reactive force of the spring member is received by the shaft member.

5. A tape loading apparatus according to claim 2, further comprising: a pair of synchronous gears disposed on base portions of the first and second swinging arms respectively, the pair of synchronous gears always meshingly engaged with each other.

6. A tape loading apparatus according to claim 3, wherein each of the first and second swinging arms comprises a loading arm including the synchronous gear, a slider including the loading pin, and a loading lever for swingably connecting the loading arm and the loading lever, the joint portion serves as a connecting portion between the loading arm and the loading lever.

7. A tape loading apparatus according to claim 6, wherein each of the joint portions of the first and second swinging arms is structured by fitting a engaging pin disposed on the loading lever into an elongated hole formed in a loading arm and extending in a longitudinal direction of the loading arm, the spring member composed of a coil spring is interposed between the engaging pin and a spring receiving portion formed in the loading arm.

8. A tape loading apparatus according to claim 2, wherein the chassis has guide grooves for guiding the projecting movements of the first and second loading pins respectively, the positioning stoppers are disposed on respective end portions of the guide grooves.

9. A tape recorder comprising:

a mode switching member having a teeth row portion;

a mode gear being meshingly engageable with the mode switching member;

a shaft member for rotatably supporting the mode gear;

first and second swinging arms being synchronously swingable by a rotation of the mode gear to a loading position or to a unloading position;

first and second loading pins disposed on leading end portions of the first and second swinging arms respectively, the first and second loading pins being projectingly movable to their respective loading positions for winding a cassette tape around a rotary drum by synchronous swinging movements of the first and second swinging arms in the tape loading direction;

a chassis; and spring members disposed in the first and second swinging arms respectively, the spring members elastically urging the first and second loading pins against positioning stoppers respectively disposed in the chassis to position the first and second loading pins to the loading positions, wherein reactive forces of the spring members is received by the shaft member to prevent the reactive force from being applied to the mode switching member when the first and second loading pins are elastically pressed against the positioning stoppers.

* * * * *